United States Patent [19]

Telli

[11] Patent Number: 4,732,504

[45] Date of Patent: Mar. 22, 1988

[54] FLEXIBLE FLAT BALLPOINT PEN

[75] Inventor: Rolando D. Telli, Milan, Italy

[73] Assignee: Design Machine S.N.C. di Adalberto Brunetti e Danilo Telli, Milan, Italy

[21] Appl. No.: 907,046

[22] Filed: Sep. 12, 1986

[30] Foreign Application Priority Data

Sep. 12, 1985 [IT] Italy .............................. 22988/85[U]

[51] Int. Cl.⁴ .......................... B43K 7/00; B43K 9/00
[52] U.S. Cl. ....................................... 401/209; 401/6; 401/98; 401/202; 401/213; 401/243
[58] Field of Search .................. 401/6, 195, 209, 213, 401/6, 98, 243, 202; 132/143

[56] References Cited

U.S. PATENT DOCUMENTS

| | | | |
|---|---|---|---|
| 2,139,940 | 12/1938 | Dreher | 132/143 X |
| 2,911,950 | 11/1959 | Freeman | 401/6 X |
| 3,168,072 | 2/1965 | Nitta | 401/6 X |
| 3,747,121 | 7/1973 | Siden | 401/6 X |

FOREIGN PATENT DOCUMENTS

| | | | |
|---|---|---|---|
| 2431377 | 7/1978 | France | 401/195 |
| 940785 | 11/1963 | United Kingdom | 132/143 |

Primary Examiner—Steven A. Bratlie
Attorney, Agent, or Firm—Karl F. Ross; Herbert Dubno

[57] ABSTRACT

A flat flexible ballpoint pen is formed from two foil strips which are bonded together along their peripheries except for one end through which the writing cartridge is inserted. A case also formed from flexible strips in a similar manner can accommodate the body carrying the cartridge.

9 Claims, 5 Drawing Figures

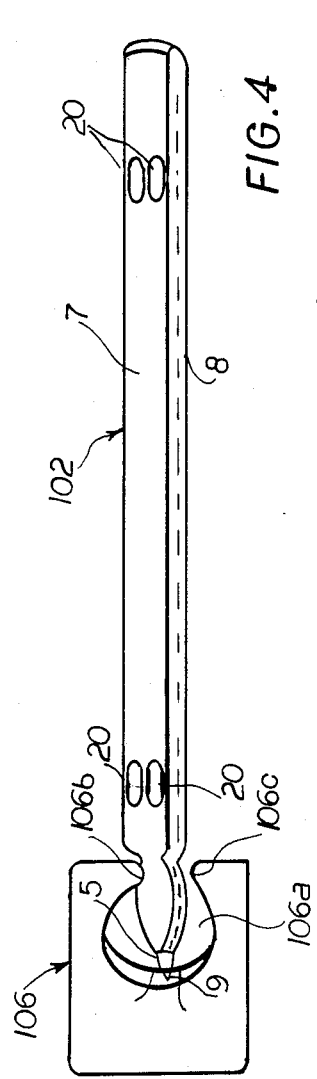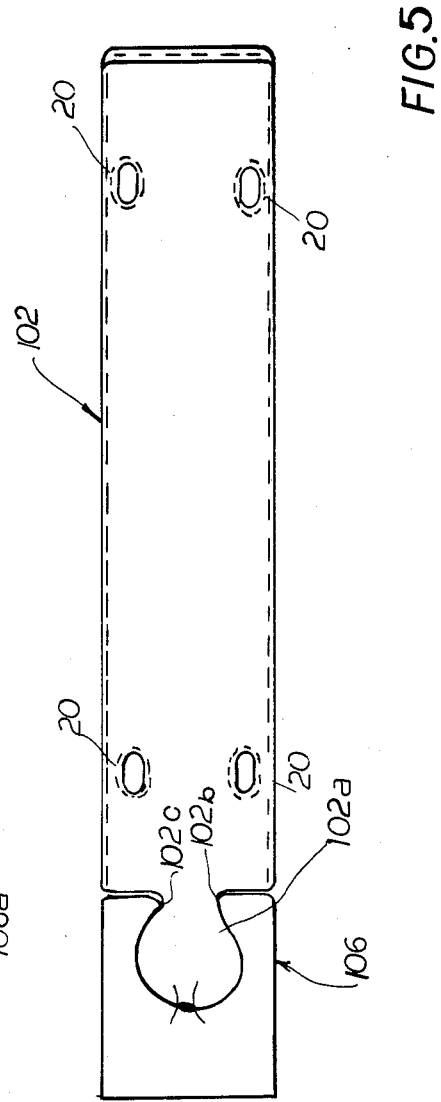

FLEXIBLE FLAT BALLPOINT PEN

FIELD OF THE INVENTION

My present invention relates to a flexible, soft and extra flat ballpoint pen and to a method of making same. More particularly the invention relates to a ballpoint pen which is more convenient to carry and in many cases more convenient to use than prior ball point pens.

BACKGROUND OF THE INVENTION

Ballpoint pens currently on the market generally have a rigid structure, including a round or prismatic body and a cartridge containing the ink and terminating, at one end, in a ballpoint pen tip from which a ball extracts ink and applies it to the substrait.

Such rigid structures are often uncomfortable to carry, e.g. in the front pockets of trousers or skirts.

Occasionally a ballpoint pen may be carried in the back pocket of a garment so that it may bend or break when the person wearing the garment sits down, thereby irreparably damaging the pen and causing substantial damage to the garment or leakage of the ink.

OBJECTS OF THE INVENTION

It is, therefore, the principal object of the present invention to provide a flexible, soft, and extra-flat ballpoint pen which eliminates the above-mentioned drawbacks.

Another object of this invention is to provide a ballpoint pen which is improved in the sense that it can be carried in any pocket without fuss and without the danger of pen breakage.

It is also an object of the invention to provide a ballpoint pen which has sufficient strength or body to enable it to be used effectively and thus has a satisfactory degree of maneuverability or ease of handling while nevertheless benefiting from the other improvements discussed.

Still another object of this invention is to provide a flexible, soft and flat ballpoint pen which can be produced simply and economically from commonly available materials and thus can have a low cost, making it capable of mass use.

A further object of this invention is to provide an improved method of making a ball point pen with the advantages of flexibility, softness and ease of manufacture.

SUMMARY OF THE INVENTION

These objects and others which will become apparent hereinafter are attained, in accordance with the invention, in a ballpoint pen having a manually grippable, flat, soft, flexible body constituted of two flat mutually juxtaposed and coextensive strips of a soft flexible material, the strips being joined together, preferably by weld seams (although other means for fastening the strips may be used), along the perimeters of the strips while leaving the perimeters of the strips unconnected at one end of the body so that the body is thereby formed with a passage open at this one end and closed at an opposite end thereof.

A ballpoint ink cartridge formed with a ballpoint tip at an end thereof is received in this passage so that the tip projects from the open end of the body.

The cartridge advantageously has a flexible ink reservoir of plastic material and the tip can be of metal.

The opening at the end of the body from which the tip of the cartridge emerges can hug the cartridge or the tip and the ink reservoir of the cartridge adjoining the tip can have a length less than that of the passage formed in the body.

According to a feature of the invention, a case is provided for the body and forms a "cap" for the tip, the case being constituted of two flat, flexible, coextensive strips, also joined together over their perimeters except for one end of the case which is left open and is of a width sufficient to accommodate the body. The open end of the case can be provided with recesses through which the closed end of the body is exposed when the body is inserted in the case to allow this end to be gripped by the fingers of the user and the body and tip to be withdrawn.

BRIEF DESCRIPTION OF THE DRAWING

The above and other objects, features and advantages of the present invention will become more readily apparent from the following description, reference being made to the accompanying drawing in which:

FIGS. 4 and 5 are respectively a side elevational and plan view illustrating another embodiment of the pen of the invention.

SPECIFIC DESCRIPTION

Figure 1:
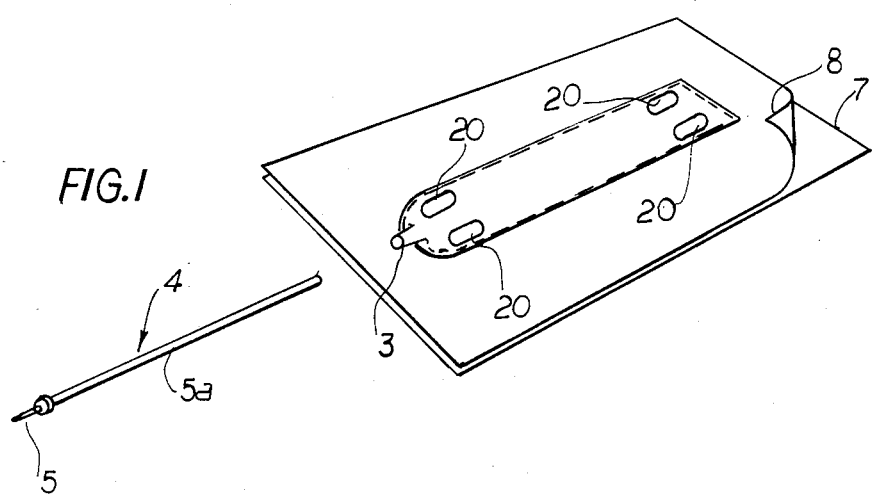
FIG. 1 is a perspective view diagrammatically illustrating the formation of a ballpoint pen.
Figure 2:
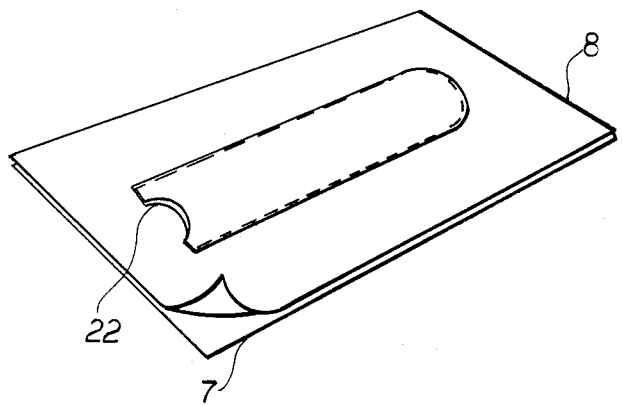
FIG. 2 is a similar perspective view showing the formation of the case.
Figure 3:
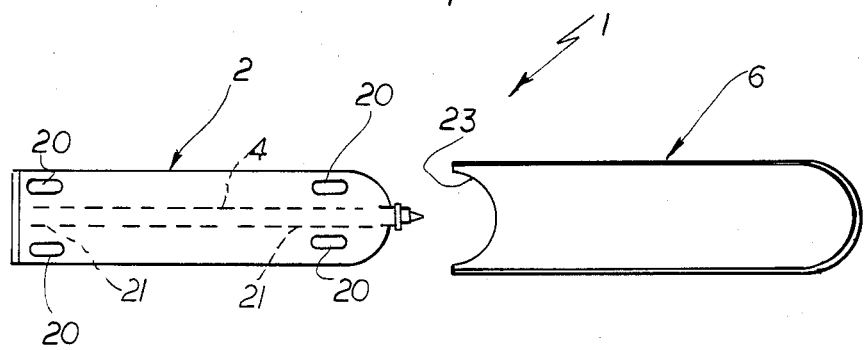
FIG. 3 is a plan view of the pen and case assembly, the pen having been withdrawn from the case.

As can be seen from FIGS. 1-3, a ballpoint pen 1 can be composed of a body 2 of two flexible strips of a synthetic resin material, e.g. polyvinyl chloride or the like, welded together along their outer perimeters after the strips have been juxtaposed and are coextensive, except for the central portion at one end of the body so that an opening 3 is defined at this end in the insertion of a writing cartridge 4 having a ballpoint tip 5 connected to the ink reservoir 5a. The cartridge 4 of a conventional design, the reservoir 5a being flexible and composed of plastic.

The strips, as can be seen from FIG. 1, are severed from two foils 7 and 8 of the thermoplastic material simultaneously with the welding of the perimetral seam and can have additional welds 20 straddling the cartridge and defining the guide channel 21 into which the cartridge is inserted.

In the embodiment of FIGS. 1-3, the "cap" for the tip is formed as a case 6 which is also welded from foil layers, e.g. the layer 7, simultaneously with severing the case from the juxtaposed foils, leaving an open end 22 into which the body 2 can be inserted. The open end 22 has recesses 23 enabling the closed end of the body 2 to be gripped, after it has been inserted into the case 6, to permit easy withdrawal.

I have found that polyvinyl chloride foil with a thickness of 1.2 mm and a surface weight of 750 g/m$^2$ has an optimum balance between flexibility and firmness allowing an effective grip of the pen.

A cap, e.g. the cap 106 shown in FIGS. 4 and 5 can also be shaped somewhat differently, e.g. so that it can be threaded onto the pen or have the tip 5 inserted into the cap in a different manner.

In the embodiment of FIGS. 4 and 5, the cap 106 is a rigid tab which has a recess 106a in which an opening 9 is formed to accommodate the tip 5. The recess is defined by two inwardly extending lobes 106b, 106c. The end of the body 102 of the pen, also formed from the foils 7 and 8 in the manner described, has a lobar shape as shown at 102a with extending notches 102b and 102c so that, when the point is inserted into the opening 9 with the plane of the cap 106 perpendicular to the plane of the body 102, the cap can be rotated through 90° to cause the lobes 106b and 106c to engage in the notches 102b and 102c and thereby secure the cap in a position in which it is coplanar with the body. The tip 5 engaged in the hole 9 forms the pivot in this rotation.

I claim:

1. A ballpoint pen, comprising:
   a manually grippable flat soft flexible elongate body constituted of two flat coextensive strips of a soft flexible material;
   edge welds between said strips fastening said flat coextensive strips together along the perimeters thereof and including opposite longitudinal edges and ends of the body while leaving the perimeters of said strips unconnected at one end of said body, said body being formed with a passage open at said one end and closed by one of said welds at an opposite end thereof; and
   a ballpoint ink cartridge formed with a ballpoint tip on an end thereof received in said passage so that said tip projects from said one end of said body, and a tubular ink reservoir of flexible material received wholly in said body over a major portion of the length of said body and connected to said tip, said welds along said opposite longitudinal edges being spaced from said ink reservoir.

2. The ballpoint pen defined in claim 1, further comprising a case forming a cap for said tip, said case being constituted of two flat flexible coextensive strips joined together over their perimeters except at one end of said case, said case being formed with an opening at said one end of a width sufficient to allow insertion of said body into said case.

3. The ballpoint pen defined in claim 1 wherein said body is formed with an opening at said one end which has a rim hugging said tip of said cartridge.

4. The ballpoint pen defined in claim 2 wherein said case is formed at said one end with recesses through which said body is exposed to facilitate gripping of said body and its withdrawal from said case.

5. The ballpoint pen defined in claim 2 wherein said strips are composed of thermally fusible synthetic resin materal and the strips of said body and of said case are thermally welded together.

6. The ballpoint pen defined in claim 1 wherein the two strips defining said body are additionally welded toghether at two longitudinally spaced apart pairs of regions flanking said cartridge and defining a guide for said cartridge.

7. The ballpoint pen defined in claim 6, further comprising a case forming a cap for said tip, said case being constituted of two flat flexible coextensive strips joined together over their perimeters except at one end of said case, said case being formed with an opening at said one end of a width sufficient to allow insertion of said body into said case.

8. The ballpoint pen defined in claim 7 wherein said case is formed at said one end with recesses through which said body is exposed to facilitate gripping of said body and its withdrawal from said case.

9. A method of making a ballpoint pen which comprises the steps of:
   superposing two foils of flexible synthetic resin material;
   cutting the superposed foils along an elongated outline to form two superposed strips in the shape of a body of the pen;
   welding said strips together concurrently with the cutting of said foils along the peripheries of said strips except at one end of said body to define between said strips a passage opening at said one end;
   providing said strips with welds at at least two locations along said passage to form guides; and
   inserting a ballpoint pen cartridge in said passage along said guides through said opening while permitting a writing tip of said cartridge to project from body through said opening, said cartridge having a flexible ink reservoir connected to said tip and received between said welds with clearance.

* * * * *